Oct. 27, 1959  G. GARNIER  2,910,637
CONTROL DEVICES HAVING A PHASE DISCRIMINATOR
Filed March 5, 1958

INVENTOR
GEORGES GARNIER
BY Toulmin & Toulmin
ATTORNEYS

United States Patent Office 2,910,637
Patented Oct. 27, 1959

2,910,637

CONTROL DEVICES HAVING A PHASE DISCRIMINATOR

Georges Garnier, Asnieres, France, assignor to Air-Equipement, Asnieres, France, a French company Application March 5, 1958, Serial No. 719,393

Claims priority, application France October 22, 1957

5 Claims. (Cl. 318—207)

The present invention relates to phase discriminator control devices, that is, devices in which controlled means are made to effect a movement whose direction depends on the phase of a control signal, for example an error signal, said controlled means remaining stationary in the absence of the error signal.

The object of the invention is to provide an improved device, characterized in that it comprises, for controlling an alternating control voltage and for controlling the direction of the phase of said voltage, two ordinarily blocked transistors connected in opposition, the individual de-blocking of these transistors being effected by a phase discriminator adapted to effect a comparison between the phase of a reference frequency and the phase of an alternating control voltage (error voltage) having the same frequency as said reference voltage.

In one embodiment of the device of the invention, the emitters of the transistors are connected in opposition and are fed in phase opposition by the alternating voltage utilized for the control, whereas the collectors of said transistors are connected in parallel to a terminal of the output circuit (control circuit).

In this embodiment, the emitters of the transistors are advantageously connected to the terminals of the secondary of a transformer whose primary is connected to the source of current providing the alternating control voltage, the secondary being furthermore connected to a terminal of a bias voltage source whose other terminal is connected, through the medium of the winding of the phase discriminator, to the bases, of the transistors.

In a modification of the invention, the emitters of the transistors are connected in parallel and are fed in phase from the source of the alternating control voltage whereas the collectors of the transistors are connected in series to the two terminals of the control circuit.

In this last-mentioned embodiment, the emitters of the transistors are advantageously connected to a terminal of the secondary of a transformer whose primary is connected to the source of the alternating control voltage, the other terminal of said secondary being connected to a terminal of a bias voltage source whose other terminal is connected, through the medium of the winding of the phase discriminator, to the bases of the transistors.

In both embodiments, the control circuit advantageously comprises an alternating current amplifier whose input is connected to the secondary of a coupling transformer whose primary is connected respectively to the collectors of the transistors and to the negative terminal of the source of the usual D.C. voltage supplying the transistors, which source has the positive terminal connected in the usual manner to the emitters of the transistors.

Further features and advantages of the invention will be apparent from the ensuing description of one embodiment and a modification of the invention with reference to the accompanying diagrammatic drawing, to which the invention is in no way restricted.

Figure 1:
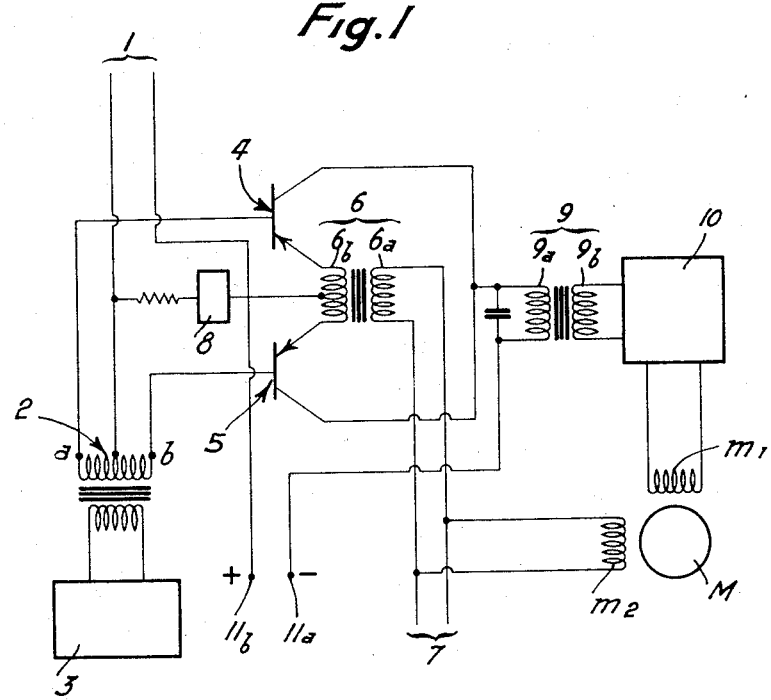
Fig. 1 is a diagram of the connections of the control device assembly.

In the embodiment shown in Fig. 1, it is assumed that the controlled mechanism is a two-phase motor M the operation and direction of rotation of which are functions respectively of the existence of an alternating error voltage having frequency F1 applied to the input terminals 1 of the device and of the phase of said voltage, which phase is compared in a phase discriminator 2 with the reference phase of an alternating voltage having the same frequency F1 supplied by a reference oscillator 3.

The terminals $a$ and $b$ of the phase discriminator 2 are connected to the bases of the two transistors 4 and 5, the arrangement being such that in the absence of an error voltage, an alternating voltage of frequency F1 and amplitude V1 is applied to said bases.

The emitters of the transistors are connected to the terminals of the secondary $6b$, having a middle connection, of a transformer 6 whose primary $6a$ is supplied with alternating current of frequency F2 (for example, a frequency of 400 c./s. suitable for supplying to the motor M), through terminals 7.

The alternating voltage of amplitude V2 applied to the emitters of the transistors 4 and 5 is such that the voltage phases supplied said transistors are in opposition.

It should be observed that the voltage V2 acting on the emitters of the transistors can be applied thereto by means other than the transformer 6, for example through the medium of resistors or capacitors.

A bias voltage source 8, providing a fixed voltage $Vp$, is interposed between the middle connection of the secondary $6b$ and the middle connection of the winding of the phase discriminator 2 so that the transistors 4 and 5 are biassed at the aforementioned voltage $Vp$ which voltage is equal to the cut off voltage of the transistors submitted to the voltages $+V1$ and $+V2$. In this manner, the two transistors remain blocked in the absence of an error voltage at 1.

The collectors of the transistors are coupled in parallel and connected to one of the terminals of the primary $9a$ of a coupling transformer 9 whose secondary $9b$ is connected to the input of an alternating current amplifier 10 which is preferably so arranged that its maximum output is at frequency F2. The other terminal of the primary $9a$ is connected to the negative terminal $11a$ of a D.C. voltage source whose positive terminal $11b$ is connected to the emitters of the transistors through the winding $6b$.

The output of the amplifier 10 is connected to the controlled coil $m1$ of the two-phase motor M whose reference coil $m2$ is fed directly by the terminals 7 with alternating current of frequency F2.

The control device described hereinbefore operates in the following manner:

In the absence of an error voltage across the terminals 1, the transistors remain blocked owing to the action of the bias voltage $Vp$ (equal to the cut off voltage).

The aforementioned transistors do not discharge into the winding $9a$ and the controlled coil $m1$ carries no current. As the reference coil $m2$ is only coil fed with current, the motor M does not rotate.

As soon as there is an error voltage at the terminals 1, this voltage, depending on its phase, is added to that furnished by one of the terminals ($a$ or $b$) of the phase discriminator 2 and is subtracted from that furnished by the other terminal ($b$ or $a$) of this discriminator so that one of the two transistors 4 or 5 becomes conductive (the other remaining blocked) and allows passage of the frequency F2 in the collector of the transistor in question. As the emitters of the two transistors are in phase opposition, the connection common to the two collectors carries undulatory impulse trains of frequency F2 whose phase is a function of that of the signal of frequency F1.

The controlled coil $m1$ of the motor M therefore carries a current of frequency F2 whose phase depends on frequency F1. Means (not shown in the drawing) are obviously provided for shifting the phase of the current in the coil $m1$ or in the coil $m2$ through a certain angle so that there is obtained a rotating field. At this moment, the motor M rotates in one direction or the other, depending on the direction of the phase of the error signal of frequency F1.

Figure 2:
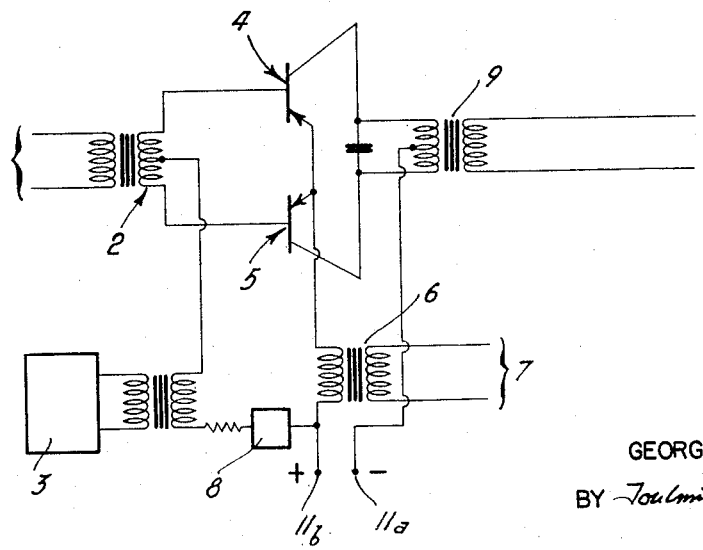
Fig. 2 is a partial diagram of a modification of the control device.

The modification shown in Fig. 2, in which like reference characters designate like elements already described and shown in Fig. 1, differs from the first embodiment in that the collectors of the transistors 4 and 5 are connected in opposition to the terminals of the primary of the transformer 9 and in that the emitters of said transistors are connected in parallel to a terminal of the secondary of the transformer 6 through which is injected into this device the voltage of frequency F2 to be fed (during the existence of the error signal) to the controlled coil. Such a control device is of use notably, but not exclusively, in radio compasses.

Although specific embodiments of the invention have been described, many modifications and changes may be made therein without departing from the scope of the invention as defined in the appended claims.

What I claim is:

1. Control device for controlling motive means comprising: a phase discriminator connectible to a source of alternating voltage capable of providing an error signal characterized by its phase and the direction of said phase, and to a source of alternating reference voltage having a frequency equal to that of the source providing said signal; a source of alternating control current for controlling the controlled motive means; two transistors connected in opposition relative to one another and whose bases are connected to the phase discriminator; connecting means for connecting the collectors of the transistors to the motive means; a source of direct current connected to the transistors for feeding the latter with feed voltage; bias means interposed between the bases of the transistors and the emitters of said transistors and arranged to supply to the transistors a cut off voltage so that the transistors are ordinarily blocked in the absence of an error signal but as soon as such an error signal appears and in consequence a voltage appears at one or the other terminal of the phase discriminator, the corresponding transistor becomes conductive and permits the passage to the motive means of the control current; and a transformer having a primary and a secondary to which the emitters of the transistors and a terminal of the bias means are connected, the other terminal of the bias means being connected, through the medium of the phase discriminator, to the bases of the transistors, the primary of said transformer being connected to the source of control current.

2. Control device as claimed in claim 1, wherein the emitters of the transistors are connected, in opposition, to the ends of the secondary of said transformer so as to be subjected in phase opposition to the alternating control voltage, whereas the collectors of said transistors are connected in parallel to a terminal of the connecting means.

3. Control device as claimed in claim 1, wherein the secondary of the transformer is connected to the emitters of the transistors in parallel and to a terminal of the bias means whose other terminal is connected, through the medium of the phase discriminator, to the bases of the transistors whose collectors are connected in opposition to the controlled motive means.

4. Control device as claimed in claim 1, wherein the connecting means comprise a transformer whose secondary is connected to the controlled motive means, whereas its primary is connected to the collectors of the transistors.

5. Control device as claimed in claim 1, wherein the connecting means comprise an alternating current amplifier whose input is connected to the collectors of the transistors and whose output is connected to the controlled motive means.

References Cited in the file of this patent

UNITED STATES PATENTS 2,698,392   Herman _____ Dec. 28, 1954